(12) United States Patent
Chao

(10) Patent No.: US 8,194,179 B2
(45) Date of Patent: Jun. 5, 2012

(54) ELECTRONIC IMMEDIATE IMAGING SYSTEM AND METHOD

(75) Inventor: Wei-Min Chao, Jhongli (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 429 days.

(21) Appl. No.: 12/453,309

(22) Filed: May 6, 2009

(65) Prior Publication Data
US 2010/0149346 A1 Jun. 17, 2010

(30) Foreign Application Priority Data
Dec. 11, 2008 (TW) .............................. 97148215 A

(51) Int. Cl.
H04N 5/222 (2006.01)
H04N 5/225 (2006.01)

(52) U.S. Cl. .................... 348/372; 348/333.02

(58) Field of Classification Search ............. 348/333.01, 348/333.02, 333.11, 372
See application file for complete search history.

(56) References Cited

U.S. PATENT DOCUMENTS

| | | | |
|---|---|---|---|
| 7,233,807 B2* | 6/2007 | Lim ........................... | 455/556.1 |
| 7,460,603 B2* | 12/2008 | Chen et al. ..................... | 375/257 |
| 7,505,073 B2* | 3/2009 | Rai et al. ................... | 348/333.05 |
| 7,576,784 B2* | 8/2009 | Yen et al. .................... | 348/222.1 |
| 2004/0212737 A1* | 10/2004 | Hsu ................................. | 348/584 |
| 2005/0146630 A1* | 7/2005 | Min et al. ................. | 348/333.02 |
| 2006/0114205 A1* | 6/2006 | Shen et al. ....................... | 345/88 |

* cited by examiner

Primary Examiner — Timothy J Henn
(74) Attorney, Agent, or Firm — Thomas|Kayden

(57) ABSTRACT

The invention discloses an electronic immediate imaging system. The electronic immediate imaging system includes an image capturing module and a display module. The image capturing module includes an image capturing/processing unit, a multiplexer, and an image converting/transmitting unit. The image capturing/processing unit is used for capturing an image to generate a first image signal related to the image. The multiplexer is coupled to the image capturing/processing unit and for receiving and converting the first image signal to a second image signal. The image converting/transmitting unit, coupled to the multiplexer, is for converting the second image signal to a third image signal and transmitting the third image signal out. The display module includes a first image receiver and a display unit. The first image receiver is coupled to the image converting/transmitting unit and for receiving the third image signal. The display unit is used for displaying the image according to the third image signal.

9 Claims, 5 Drawing Sheets

ELECTRONIC IMMEDIATE IMAGING SYSTEM AND METHOD

BACKGROUND OF THE INVENTION

1. Field of the Invention

The present invention relates to an electronic immediate imaging system, and more particularly, to an electronic immediate imaging system applied for a user to switch between the mirror function and the original computer screen rapidly without influence of hardware and operating system.

2. Description of the Prior Art

Notebook has become an indispensable tool for peoples' work and home lives. With a built-in digital camera, we can use said camera of a notebook to capture a personal image and display it on the liquid crystal display (LCD) of the notebook. Accordingly, the notebook performing the above-mentioned function is known as an "electronic mirror." However, when a user wants to start the electronic mirror, he or she has to wait a long boot time of the operating system of the notebook, and the situation makes it not easy to promote the market of the application.

FIG. 1 is a flow chart illustrating a boot process of a computer according to the prior art. When a user presses the power button, the software boot flow is started, and said flow is divided into three major processes: steps S101~S104 represent the Basic Input Output System (BIOS) process, steps S105~S111 represent the Boot Loader process and steps S112~S114 represent the Operating System Kernel process.

Take a notebook with an Intel Core 2 Duo T7200 Central Processing Unit (CPU) as an example, the time needed by each of the major boot process under the operating system of Windows XP SP2 is as follow: 10 seconds for the process of steps S101~S104, 20 seconds for the process of steps S105~S111, and 5 seconds for the process of steps S112~S114. Accordingly, it can be estimated that at least 35 seconds is taken for a notebook to start the function of the electronic mirror.

Under the traditional framework, after the user starts the operating system of the notebook, he or she has to start a general video application program. The video application program is used to obtain a video data via a photo driving program and then display the video data on the screen of the notebook. Therefore, it takes dozens of seconds to several minutes for a user to see his or her own image on the screen of the notebook from he or she pushes the power button of the notebook (the length of time needed depends on the type of the computer and the numbers of the installed application programs). It is believed that the situation bring a bad experience to the user so that the user refuse to use the application.

Accordingly, the invention provides an electronic immediate imaging system applied to a notebook for a user to switch between the mirror function and the original computer screen rapidly without influence of hardware and operating system to solve the aforementioned problem.

SUMMARY OF THE INVENTION

A major aspect of the present invention is to provide an electronic immediate imaging system applied to a notebook.

According to an embodiment of the invention, the invention provides an electronic immediate imaging system comprising an image capturing module and a display module. The image capturing module comprises an image capturing/processing unit, a multiplexer and an image converting/transmitting unit. The image capturing/processing unit is used for capturing an image and generating a first image signal related to the image. The multiplexer, coupled to the image capturing/processing unit, is used for receiving and converting the first image signal to a second image signal. The image converting/transmitting unit, coupled to the multiplexer, is for converting the second image signal to a third image signal and transmitting the third image signal out. The display module comprises a first image receiver and a display unit. The first image receiver, coupled to the image converting/transmitting unit, is for receiving the third image signal. The display unit is used for displaying the image according to the third image signal.

Another aspect of the present invention is to provide an electronic immediate imaging method. An image capturing module is coupled respectively to a display module and a graphic unit of a computer system. The image capturing module is used for capturing a first image and the graphic unit is used for generating a second image. The image capturing module comprises a first output mode and a second output mode. The electronic immediate imaging method of the invention comprises the steps of: determining a current output mode of the image capturing module; if the current output mode of the image capturing module is the first output mode, transmitting the first image directly from the image capturing module to the display module and displaying on the display module; and, if the current output mode of the image capturing module is the second output mode, transmitting the second image from the image capturing module to the display module and displaying on the display module.

Compared to the prior art, the invention provides an electronic immediate imaging system and method applied to a notebook. By the addition of the multiplexer and the image converting/transmitting unit, a user can switch the mirror function and the original computer screen rapidly without the influence of the computer's operating system to meet the requirement of immediate looking in the mirror.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

DETAILED DESCRIPTION OF THE INVENTION

Figure 1:
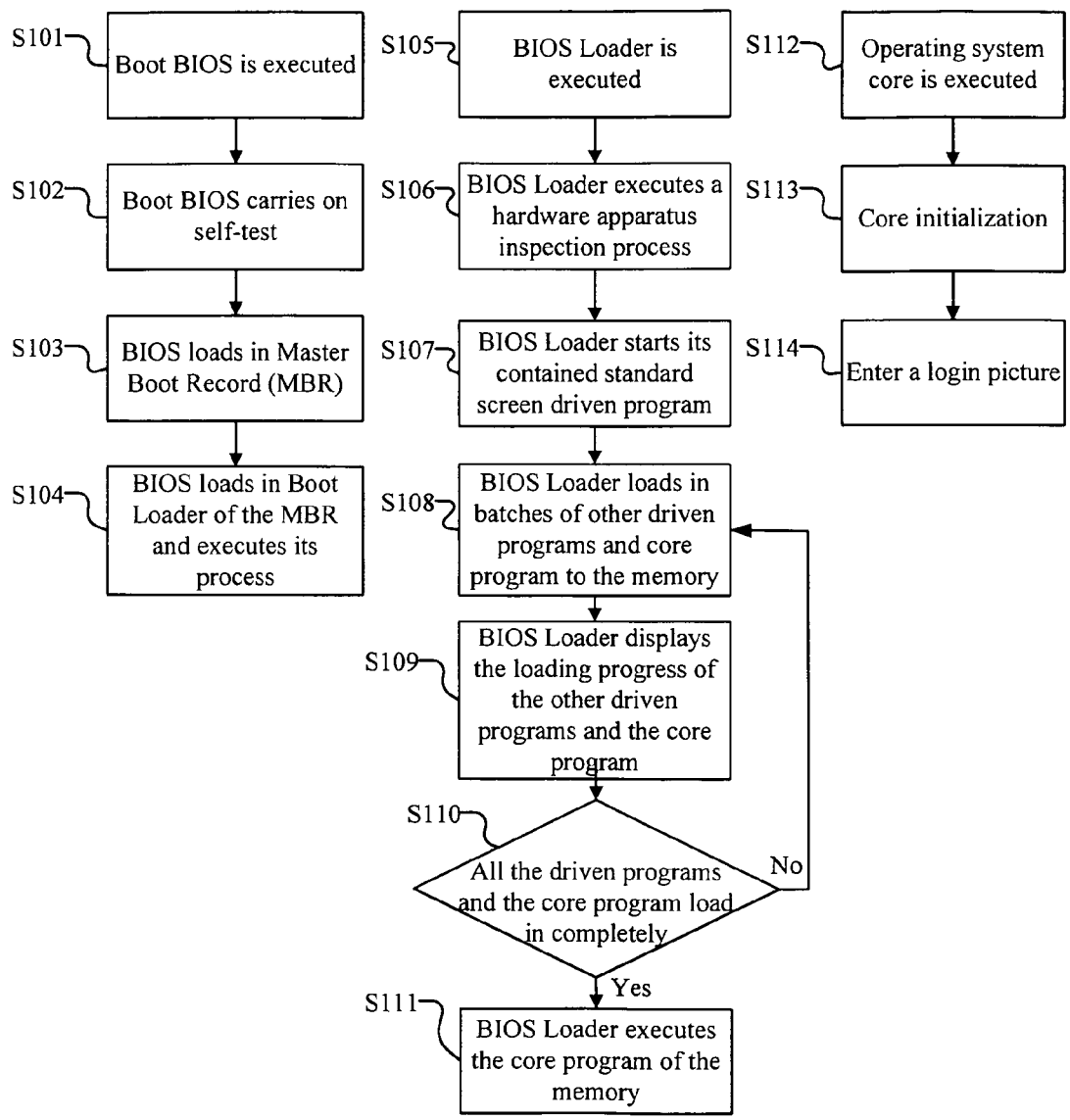
FIG. 1 is a flow chart illustrating a boot process of a computer according to prior art.
Figure 2:
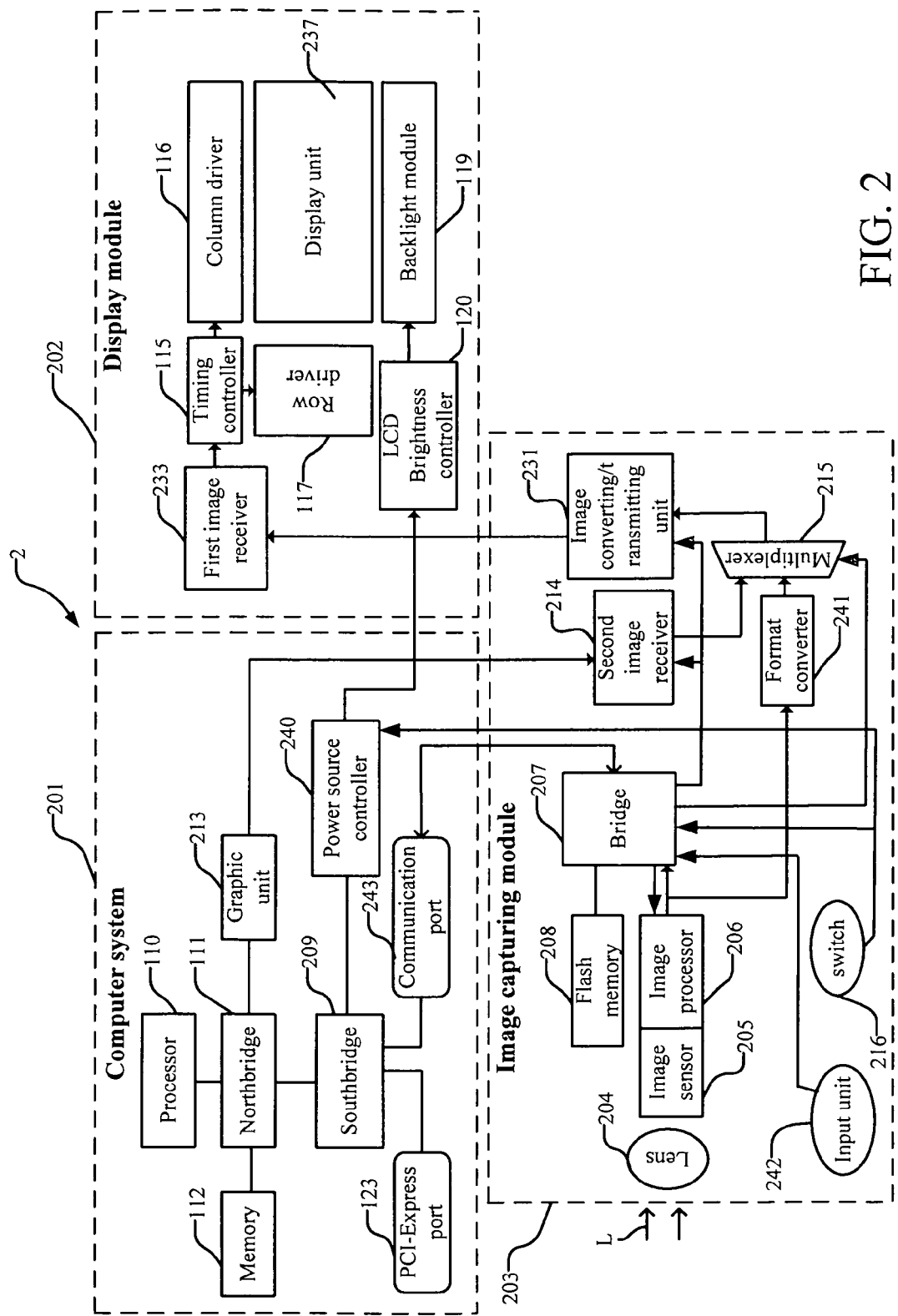
FIG. 2 is a functional block diagram illustrating an electronic immediate imaging system according to an embodiment of the invention.

Please refer to FIG. 2. FIG. 2 is a functional block diagram illustrating an electronic immediate imaging system 2 according to an embodiment of the invention. The electronic immediate imaging system 2 of FIG. 2 can be implemented in a notebook. As shown in FIG. 2, the electronic immediate imaging system 2 of the invention comprises a computer system 201, a display module 202 and an image capturing module 203. The computer system 201 comprises a processor 110, a Northbridge 111, a memory 112, a graphic unit 213, a Southbridge 209, a PCI-Express port 123, a power source controller 240 and a communication port 243.

The display module 202 can be a computer screen, which comprises a first image receiver 233, a timing controller 115, a column driver 116, a row driver 117, a backlight module 119, a LCD brightness controller 120 and a display unit 237.

The image capturing module 203 can be a network webcam, which comprises a lens 204, an image sensor 205, an image processor 206, a bridge 207, a flash memory 208, a multiplexer 215, an image converting/transmitting unit 231, a second image receiver 214, a switch 216, an input unit 242 and a format converter 241.

An image light L is condensed on the image sensor 205 via the lens 204. The image sensor 205 converts the optical signal to an electric signal which is a raw pixel data. Afterward, the image processor 206 converts the raw pixel data to a YUV color gamut pixel (i.e. the first image signal) after a series of image processing. The format converter 241 converts the YUV pixel data to a RGB pixel data and then transmits it to the multiplexer 215.

The bridge 207 with a built in microprocessor is used for implementing the firmware of the flash memory 208 (initializing the image sensor 205, the image processor 206, the image converting/transmitting unit 231, the second image receiver 214 and the multiplexer 215), and for transmitting the YUV pixel data to the Southbridge 209 of the computer system via a USB interface.

The second image receiver 214, coupled between the multiplexer 215 and the graphic unit 213 of the computer system 201, is for receiving an external image signal (for example, a picture of the computer's screen) from the graphic unit 213 and transmitting it to the multiplexer 215, wherein the external image signal is a low-voltage differential signal (LVDS). In addition, the bridge 207 can control the multiplexer 215 to receive one of the first image signal and the external image signal selectively.

The switch 216 is coupled to the power source controller 240 of the computer system 201 and the bridge 207. When a user operates the switch 216, the switch 216 generates a first notice signal and transmits it to the power source controller 240, and the power source controller 240 controls the individual power source of the image capturing module 203 and the display module 202 according to the first notice signal. Besides, the bridge 207 is actuated selectively to implement the initialization process according to the first notice signal. For example, if the user wants to see her/his image immediately, s/he can turn on the switch 216 which notifies the power source controller 240 to turn on the power sources of the image capturing module 203 and the display module 202 immediately. At the same time, the switch 216 also notifies the bridge 207 to implement the initialization process to the peripheral units.

After that, the bridge 207 controls the multiplexer 215 to receive and convert the first image signal to a second image signal, wherein the second image signal is a transistor-transistor logic signal (TTL). The image converting/transmitting unit 231, coupled to the multiplexer 215, is for converting the second image signal to a third image signal and transmitting the third image signal to the first image receiver 233 of the display module 202, wherein the third image signal is a LVDS signal. Then, the display unit 237 is used for displaying the user's image according to the third image signal.

Besides generating the first notice signal via the switch 216, the user also can generate a second notice signal by implementing an application program of the computer system 201 which is related to image capturing. As shown in FIG. 2, the bridge 207 is coupled to the communication port 243 of the computer system 201 and receives the second notice signal via the communication port 243. The bridge 207 is actuated to implement the initialization process according to the second notice signal, so as to let the user operate the image capturing module 203.

The input unit 242, coupled to the bridge 207, is for responding to a user's operation to transmit an adjustment signal to the bridge 207, so that the bridge 207 could inform the image processor 206 to adjust the first image signal for stretching the picture, rotating the picture horizontally or vertically, or shifting the picture according to the adjustment signal.

Figure 3A:
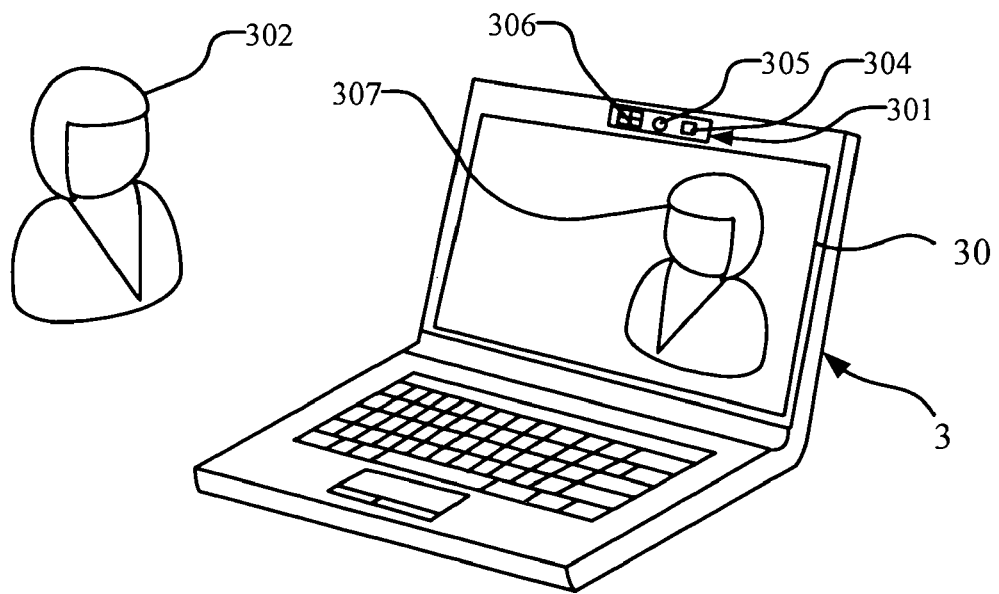
FIG. 3A and FIG. 3B are the applications of the electronic mirror according to the invention.
Figure 3B:
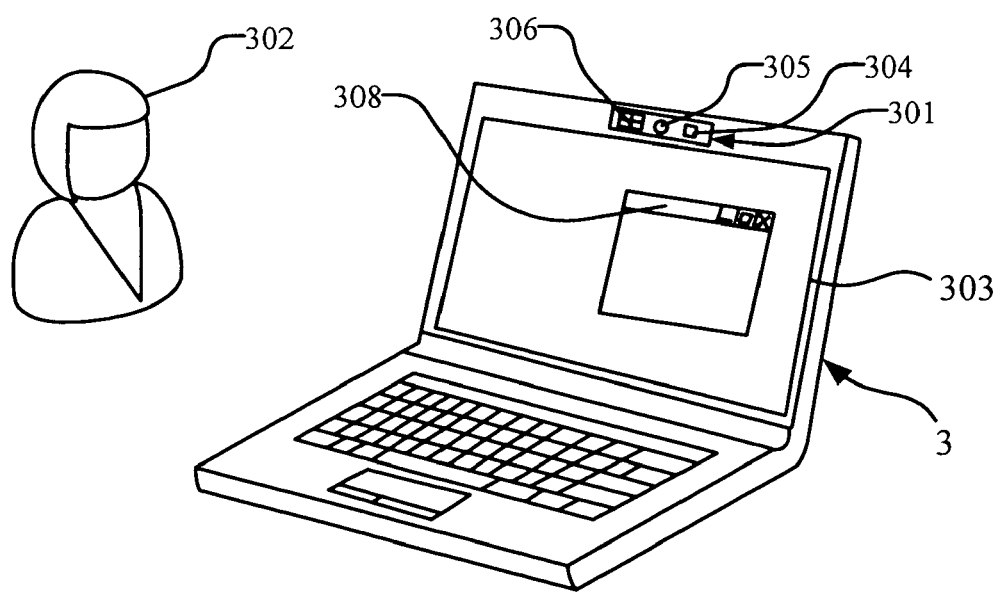
Figure 4:
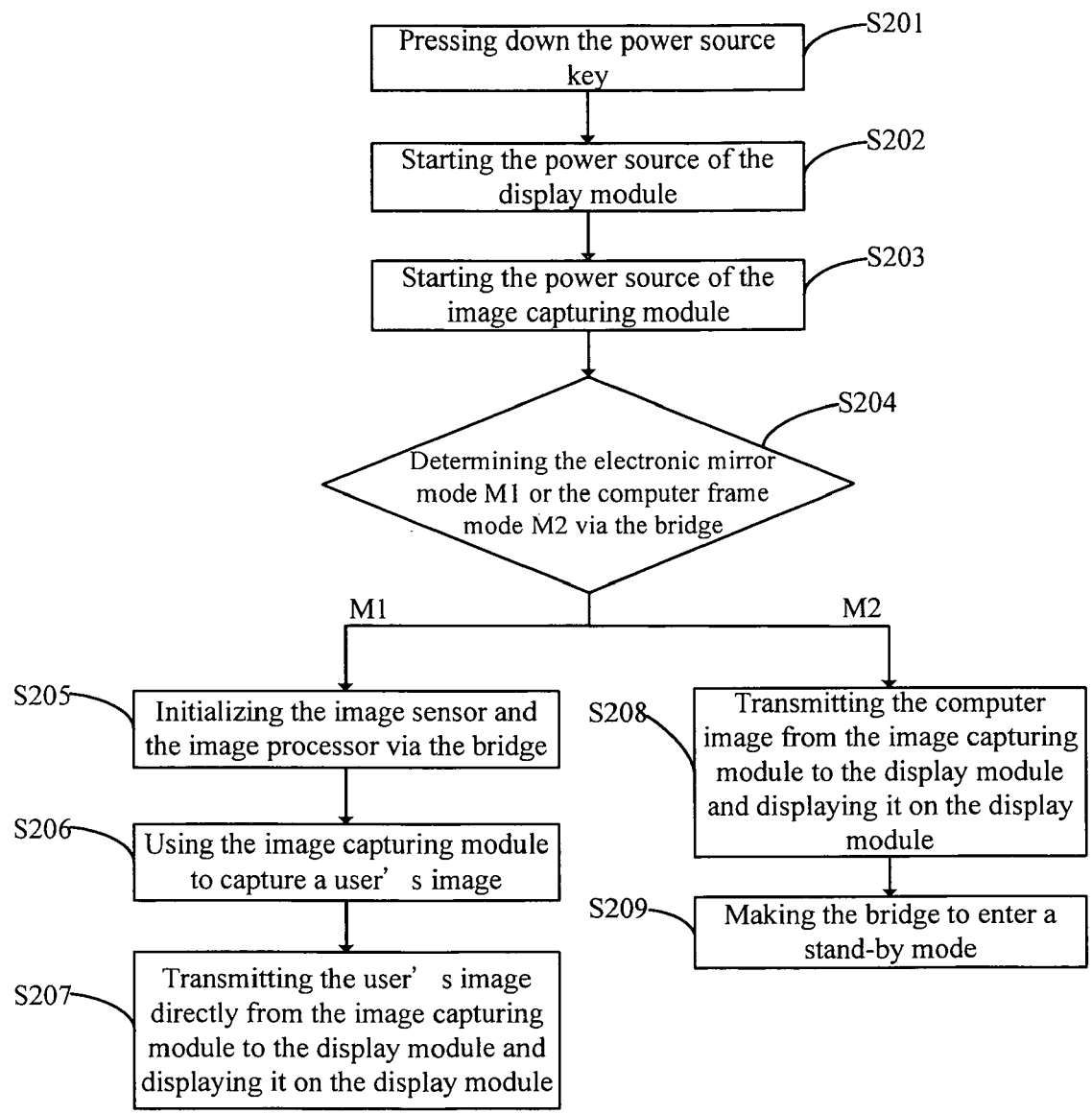
FIG. 4 and FIG. 5 are flow charts illustrating the electronic immediate imaging method according to the invention.
Figure 5:
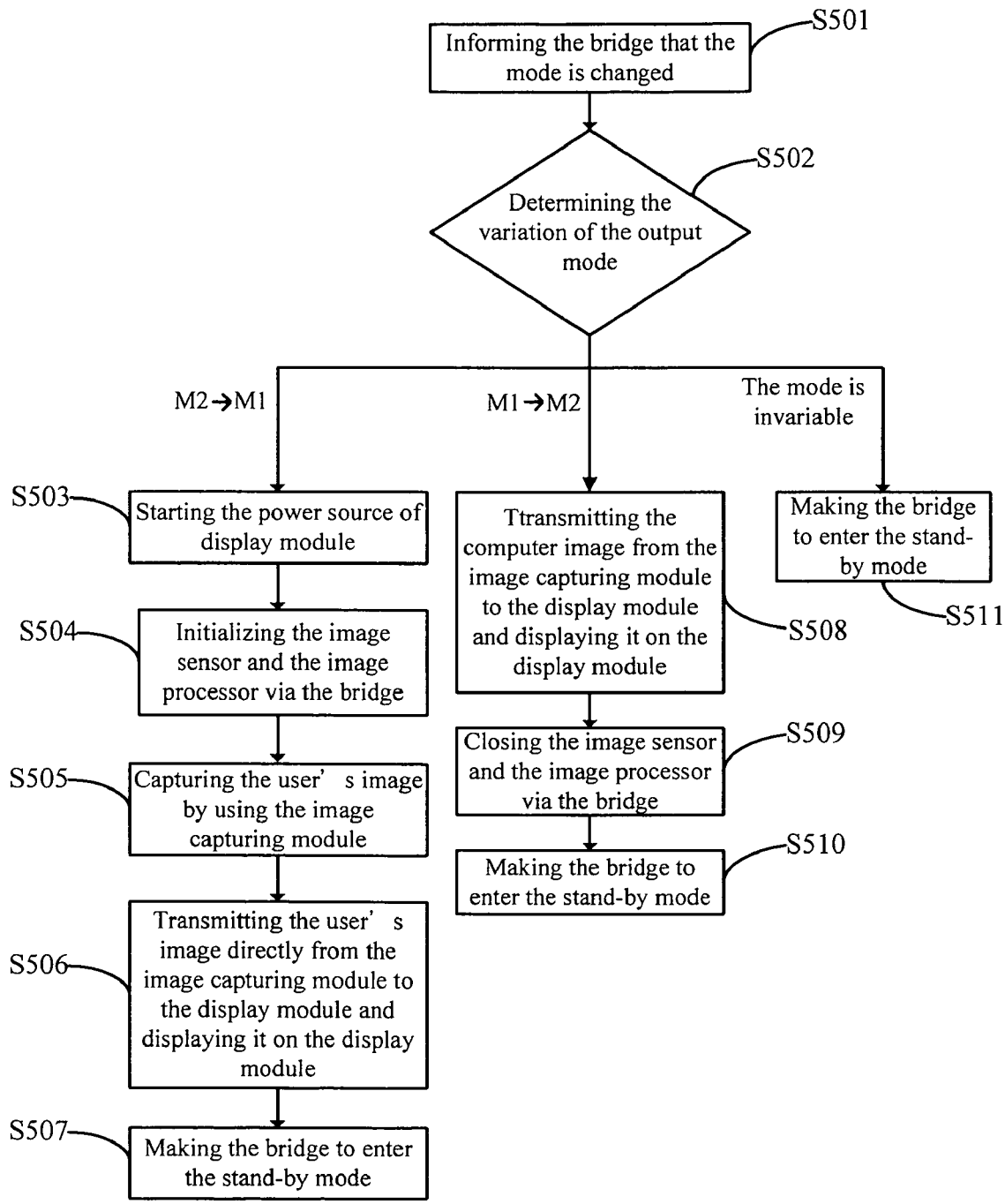

Please refer to FIG. 4 and FIG. 5. FIG. 4 and FIG. 5 are flow charts illustrating the electronic immediate imaging method according to the invention. Please refer to FIG. 3A and FIG. 3B together. In practice, the electronic immediate imaging method can be applied to a notebook 3. The notebook 3 comprises an image capturing module 301, a display module 303 and a contained computer system. The image capturing module 301 is coupled to the display module 303 and a graphic unit of the computer system. The image capturing module 301 comprises a bridge, an image sensor and an image processor, wherein the bridge is for initializing the image sensor and the image processor.

The image capturing module 301 is used for capturing a user's image while the graphic unit is used for generating a computer image. Besides, the image capturing module 301 has an electronic mirror output mode M1 and a computer picture output mode M2.

Please refer to FIG. 4. FIG. 4 is a flow chart illustrating the electronic immediate imaging method after the notebook is booted.

First, step S201 is performed to press down the power source key.

Then, step S202 is performed to start the power source of the display module 303.

Next, step S203 is performed to start the power source of the image capturing module 301.

Finally, step S204 is performed to determine a current output mode of the image capturing module.

If the current output mode of the image capturing module is the electronic mirror mode M1, step S205 is performed to initialize the image sensor and the image processor via the bridge. Then, step S206 is performed to capture the user's image via the image capturing module 301. Finally, step S207 is performed to transmit the user's image directly from the image capturing module 301 to the display module 303 and display it on the display module 303.

If the computer picture mode M2 is determined in the step S205, then step S208 is performed to transmit the computer image from the image capturing module 301 to the display module 303 and display it on the display module 303. Next, step S209 is performed to make the bridge to enter a stand-by mode.

In an embodiment, after a user 302 presses down the power source key of the notebook 3, the output mode can be preset to start the electronic mirror mode M1 when going to the step S204, and at this time, the user 302 can see a user's image 307 on the display module 303, as shown in FIG. 3A. After the operating system is booted completely, the output mode of the image capturing module 301 is switched to the computer picture mode M2, and, at this time, the user 302 can see a computer picture 308 of the operating system, as shown in FIG. 3B.

Please refer to FIG. 5. FIG. 5 is a flow chart illustrating the method at the normal work of the notebook after the notebook is booted. The method comprises the following steps.

Firstly, step S501 is performed to inform the bridge that the mode is changed via the switch 304 or the computer application program.

Next, step S502 is performed to determine the variation of the output mode.

If the output mode is determined to be invariable in the step S502, step S511 is performed to make the bridge to enter the stand-by mode.

If the output mode is determined to switch from the computer picture mode M2 to the electronic mirror mode M1, step S503 is performed to start the power source of the display module 303. Then, step S504 is performed to initialize the image sensor and the image processor via the bridge. Next, step S505 is performed to capture the user's image by using the image capturing module 301. Afterward, step S506 is performed to transmit the user's image directly from the image capturing module 301 to the display module 303 and display it on the display module 303. Finally, step S507 is performed to make the bridge to enter the stand-by mode.

If the output mode is determined to switch from the electronic mirror mode M1 to the computer picture mode M2, step S508 is performed to transmit the computer picture from the image capturing module 301 to the display module 303 and display it on the display module 303. Next, step S509 is performed to close the image sensor and the image processor via the bridge. Finally, step S510 is performed to make the bridge to enter the stand-by mode.

Take FIG. 3 as an example. When the user 302 presses down the switch 304 to choose the electronic mirror mode, a lens 305 photographs the user 302 continually and the video class is displayed immediately on the display module 303 under a normal use of the computer. When the user 302 presses down the switch 304 again, the computer picture 308 is displayed on the display module 303. Besides, under the electronic mirror mode, the user 302 can use a group of keys 306 for stretching, rotating horizontally or vertically, or shifting the user's image 307.

Please refer to Table 1. Table 1 is a comparison of the electronic immediate imaging system and method of the invention to the traditional method. When a user wants to look in a mirror but the computer is not booted, the electronic immediate imaging system and method of the invention can reduce the reaction time effectively.

TABLE 1

| Item | Application program in Windows XP SP2 operating system (Intel Core 2 Duo T7200 platform) | This invention |
| --- | --- | --- |
| Boot time | 35 seconds | zero |
| Fundamental service loading time | 8 seconds | zero |
| USB camera initial time | 1 second | 1 second |
| Total reaction time | 44 seconds | 1 second |

As shown in the Table 1, the electronic immediate imaging system 2 and method of the invention can achieve starting the function of the immediate electronic mirror in one second; compared to the traditional method which takes more than 44 seconds of boot time (it will be different depending on different equipments and operating systems).

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electronic immediate imaging system comprising:
    an image capturing module comprising:
        an image capturing/processing unit for capturing an image and generating a first image signal related to the image;
        a multiplexer, coupled to the image capturing/processing unit, for receiving and converting the first image signal to a second image signal; and
        an image converting/transmitting unit, coupled to the multiplexer, for converting the second image signal to a third image signal and transmitting the third image signal out;
    a display module comprising:
        a first image receiver, coupled to the image converting/transmitting unit, for receiving the third image signal; and
        a display unit for displaying the image according to the third image signal; and
    a computer system, wherein the image capturing module further comprises:
        a second image receiver, coupled between the multiplexer and a graphic unit of the computer system, for receiving an external image signal from the graphic unit, so that the multiplexer selectively receiving and converting one of the first image signal and the external image signal, outputting to the image converting/transmitting unit, and then outputting to the display module from the image converting/transmitting unit;
        a bridge, coupled to the image capturing/processing unit, the image converting/transmitting unit, the second image receiver and the multiplexer, for implementing an initialization process to the image capturing/processing unit, the image converting/transmitting unit, the second image receiver and the multiplexer; and
        a switch, coupled to a power source controller of the computer system and the bridge, for responding to operation of a user to transmit a first notice signal to the power source controller, and the power source controller controls the individual power source of the image capturing module and the display module according to the first notice signal.

2. The electronic immediate imaging system of claim 1, wherein the bridge is actuated selectively to implement the initialization process according to the first notice signal.

3. The electronic immediate imaging system of claim 1, wherein the bridge is coupled to a communication port of the computer system to receive a second notice signal via the communication port, and the bridge being actuated selectively to implement the initialization process according to the second notice signal.

4. The electronic immediate imaging system of claim 1, wherein the bridge controls the multiplexer to selectively receive the first image signal or the external image signal.

5. The electronic immediate imaging system of claim 1, wherein the image capturing module further comprises:
    an input unit, coupled to the bridge, for responding to operation of a user to transmit an adjustment signal to the bridge, so that the bridge informs the image capturing/processing unit to adjust the first image signal according to the adjustment signal.

6. The electronic immediate imaging system of claim 1, wherein the image capturing module further comprises:

a format converter, coupled between the image capturing/processing unit and the multiplexer, for converting the first image signal from a first color gamut to a second color gamut.

7. The electronic immediate imaging system of claim 1, wherein the second image signal is a transistor-transistor logic signal, and both the third image signal and the external image signal are low-voltage differential signals.

8. The electronic immediate imaging system of claim 1, wherein the image capturing module is a webcam and the display module is a computer screen.

9. The electronic immediate imaging system of claim 8, wherein the image capturing module, the display module and the computer system are integrated.

* * * * *